Sept. 10, 1968 P. FRENCH 3,401,323
RELUCTANCE MOTOR SWITCHING CIRCUITS
Filed April 25, 1966 3 Sheets-Sheet 1

INVENTOR.
Park French

BY ATTORNEYS

Sept. 10, 1968 P. FRENCH 3,401,323
RELUCTANCE MOTOR SWITCHING CIRCUITS
Filed April 25, 1966 3 Sheets-Sheet 2
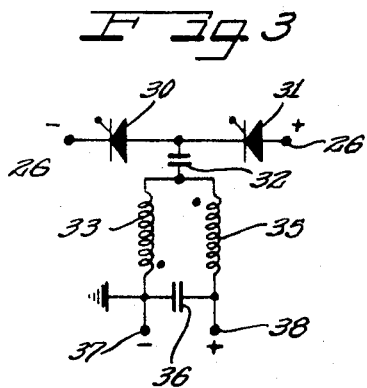
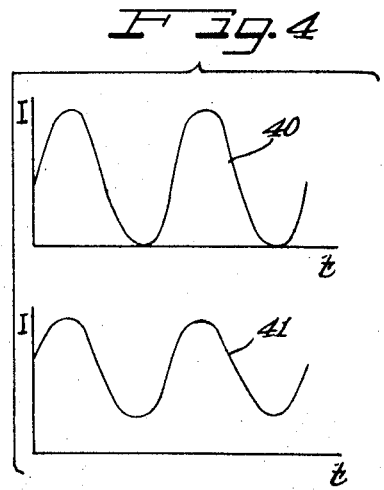
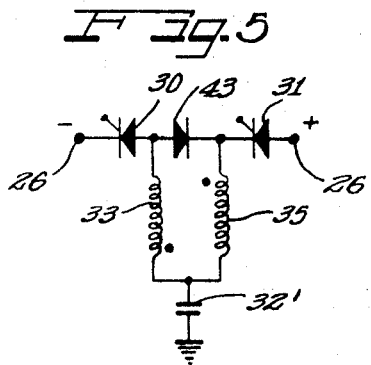
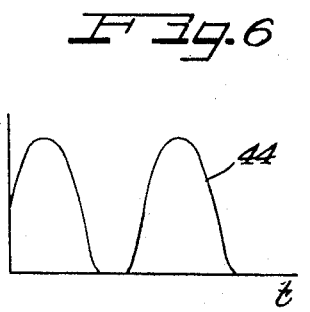
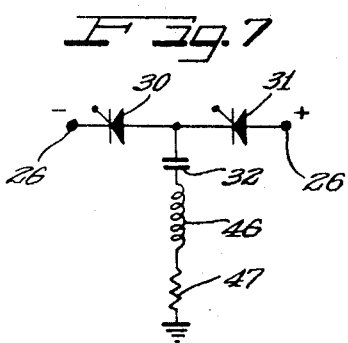
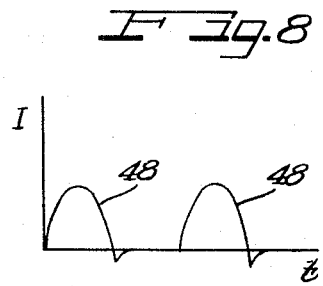
INVENTOR.
*Park French*
*Hill, Sherman, Meroni, Gross & Simpson* ATTORNEYS Sept. 10, 1968 P. FRENCH 3,401,323
RELUCTANCE MOTOR SWITCHING CIRCUITS
Filed April 25, 1966 3 Sheets-Sheet 3
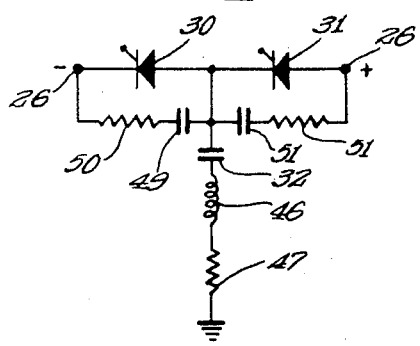
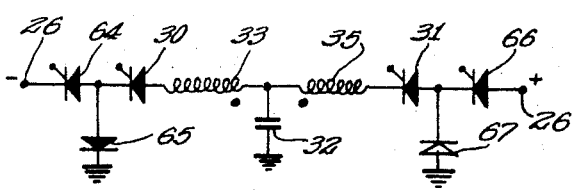
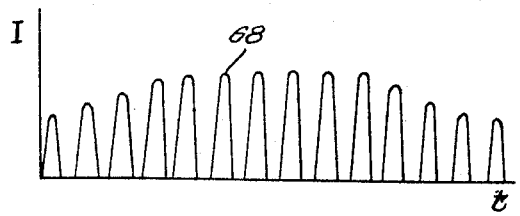
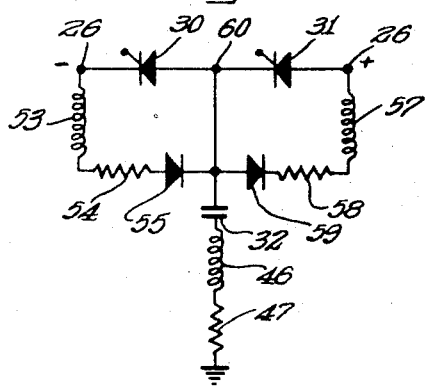
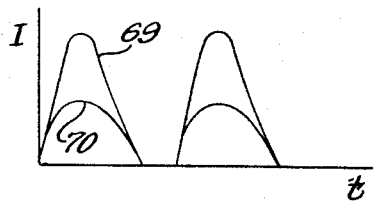
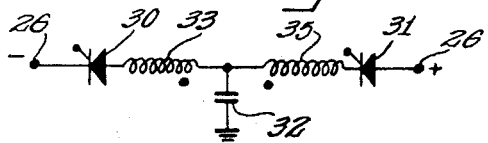
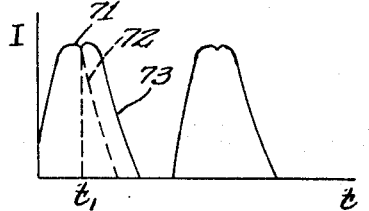
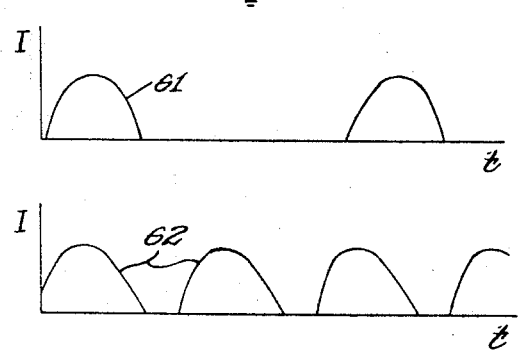
INVENTOR.
*Park French*
ATTORNEYS

United States Patent Office 3,401,323
Patented Sept. 10, 1968

1

3,401,323
RELUCTANCE MOTOR SWITCHING CIRCUITS
Park French, Aurora, Ohio, assignor to TRW Inc.,
Cleveland, Ohio, a corporation of Ohio
Filed Apr. 25, 1966, Ser. No. 545,083
12 Claims. (Cl. 318—138)

This invention relates generally to switching circuits for controlling operation of dynamoelectric machines, and more specifically to electronic switching circuits for controlling variable reluctance dynamoelectric machines.

The machines of the present invention are variable reluctance motors preferably of the disk and stator type in which a shaft carries a plurality of spaced rotor elements in interleaved or interdigitated relationship with a plurality of stator disks. Both the rotor elements and the stator elements each consist of disks having alternating sector composed of magnetic and non-magnetic materials. A coil is wound about the combination of rotor and stator elements in each rotor-stator unit. Through the arrangement of rotor and stator disks, the machines of the present invention have magnetic paths which vary periodically in reluctance with the angular position of the rotors. The magnetic flux paths link the current carrying coils which provide the necessary magnetomotive forces in the magnetic circuits. By applying the periodically varying currents to these coils in synchronism with the reluctance variations, the devices become efficient dynamoelectric motors. In the circuits of the present invention, the inductances of the coils are made of a part of a generating system for applying periodically varying energizing currents, the maximum value of the current being applied at the time when the axial reluctance of the machine is diminishing. The energizing and switching circuits also include a capacitor and an electronic switching means, such as a silicon controlled rectifier, to provide the proper timing for the current variations.

An object of the present invention is to provide simple and efficient electronic switching circuits for controlling dynamoelectric machines.

Another object of the present invention is to provide electric switching circuits which are relatively small in size and which are capable of delivering large amounts of power to dynamoelectric machines.

A feature of the present invention is the use of a pair of silicon controlled rectifiers and a capacitor which is connected in series with certain groups of windings of dynamoelectric machines so as to provide a resonant circuit.

The present invention is applicable to dynamoelectric motors of the variable reluctance type and includes electronic switching circuits operating with the inductance of the coils in the motor. One electronic switching circuit of the present invention may include a pair of silicon controlled rectifiers which are connected in series and between a source of potential. Connected to a junction point intermediate the rectifiers is a capacitor which, in turn, is connected to the coils of a dynamoelectric machine to form a resonant circuit. ePriodically varying currents are supplied to the motor coil or coils by alternate conduction of the silicon controlled rectifiers, the maximum current being applied when the axial reluctance of the motor is decreasing.

Other objects, features, and advantages will be realized and understood from the following detailed description when taken in conjunction with the accompanying drawings in which like reference numerals throughout the various views of the drawings are intended to designate similar elements or components.

On the drawings:

FIGURE 3 illustrates schematically one form of single speed switching circuits for a dual unit motor employing externally supplied D.C. bias;

FIGURE 4 illustrates diagrammatically the time versus current waveforms which may be delivered to the dual unit dynamoelectric machine;

FIGURE 5 is an alternate embodiment of the switching circuit of FIGURE 3, employing a self-biasing arrangements;

FIGURE 6 illustrates diagrammatically the time versus current waveform which is delivered to the dynamoelectric machine when using the circuit of FIGURE 5;

FIGURE 7 is an equivalent circuit for the circuits shown in FIGURES 3 and 5;

FIGURE 8 illustrates diagrammatically the time versus current waveform passing through one of the silicon controlled rectifiers;

FIGURE 9 shows an improved form of the equivalent circuit of FIGURE 7, including damping networks;

FIGURE 10 shows an alternate improved form of the circuit of FIGURE 7;

FIGURE 11 is an alternate embodiment of the switching circuit of FIGURE 3, whereby multiple speeds of a dynamoelectric machine can be obtained;

FIGURE 12 illustrates diagrammatically the time versus current waveforms which are obtainable by the circuit of FIGURE 11;

FIGURE 13 is an alternate embodiment of the switching circuit of FIGURE 11, including means for providing speed or power regulation;

FIGURE 14 illustrates diagrammatically the time versus current waveform obtainable by the circuit of FIGURE 13 under conditions of speed or power regulation;

FIGURE 15 illustrates diagrammatically the time versus current waveform of the circuit shown in FIGURE 11 illustrating low current and high current waveforms with distortions resulting from saturation of magnetic materials; and FIGURE 16 illustrates diagrammatically the time versus current waveform of the improved circuit shown in FIGURE 13.

As shown on the drawings:

Figure 1:
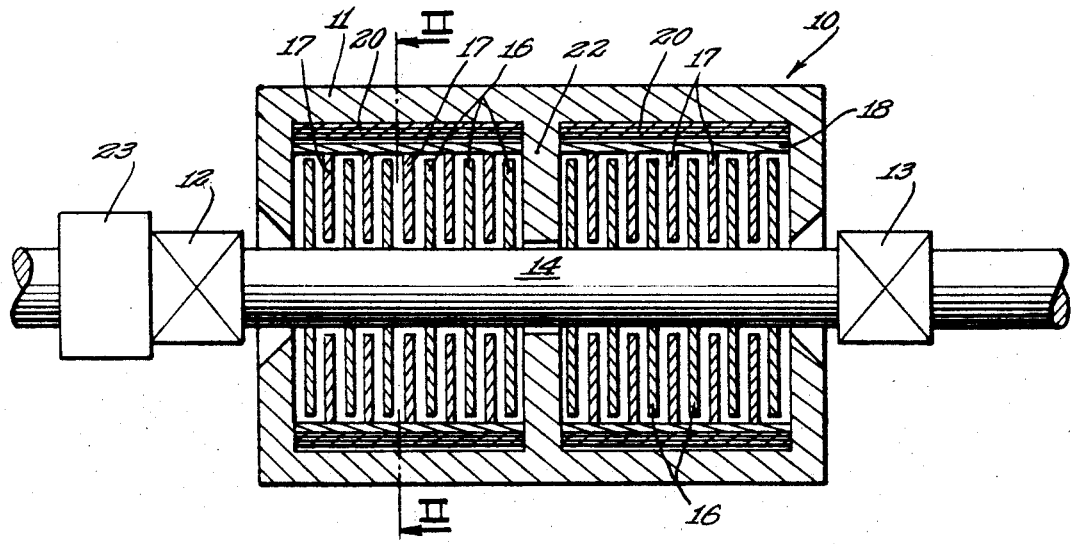
FIGURE 1 is a partly schematic view illustrating the construction of a dynamoelectric motor containing two units of rotor-stator arrays.

In FIGURE 1, reference numeral 10 indicates generally a variable reluctance dynamoelectric motor of the type to which the present invention is applicable. The motor 10 includes a frame 11 having a pair of opposed bearings 12 and 13 which journal a shaft for rotation therein. The specific motor shown in FIGURE 1 of the drawings is a dual unit type, including two sets of rotor-stator pairs connected to the same shaft to provide a higher frequency of torque impulses, and thereby achieve smaller torque ripple.

Figure 2:
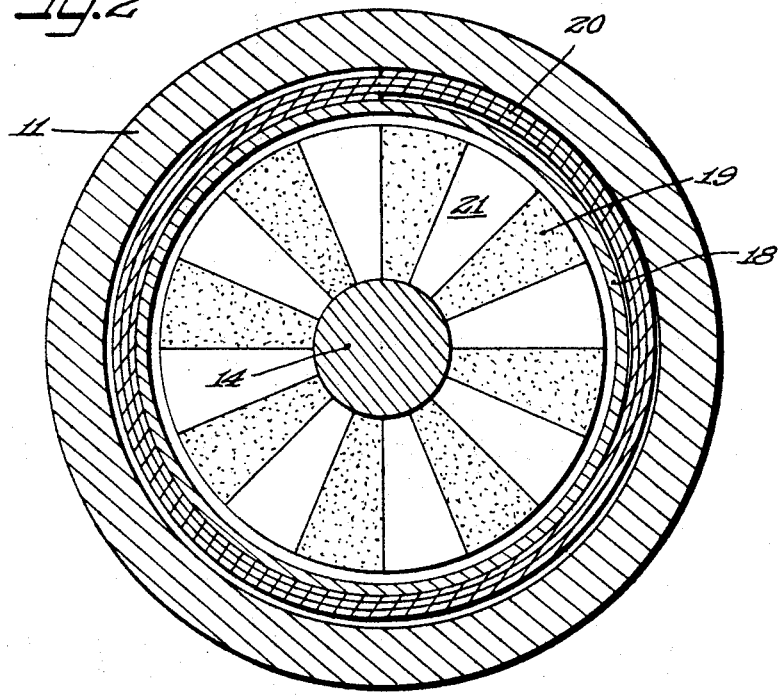
FIGURE 2 is a cross-sectional view substantially along the line II—II of FIGURE 1 and illustrating more particularly the rotor construction of the motor.

As illustrated in FIGURES 1 and 2, the shaft 14 carries a plurality of spaced rotor disks 1 which are in interleaved or interdigitated relationship with a plurality of spaced stator disks 17 supported from a ring 18 secured to the frame 11 and extending inwardly toward the preriphery of the shaft 14. Both the rotor disks and the stator disks may be identical in magnetic geometry, and, as illustrated in FIGURE 2, may consist of alternating equal width sectors 19 of ferromagnetic material and sectors 21 of non-ferromagnetic material. The central portions of the disks are to be inactive magnetically so that the shaft 14 is composed of a non-magnetic material, or the inner ends of the sectors 19 and 21 are secured to a non-magnetic ring which is secured to the shaft 14. The magnetic sectors 19 may be composed of compressed powdered iron or the like, and the sectors 21 may be composed of a suitable non-magnetic material which may be a metal such as aluminum or a ceramic material. The thicknesses of the disks 16 and 17 are small as compared to the sector widths.

An axial magnetic field is provided by a coil 20 in each unit in circumscribing relation to the stator-rotor pairs in each unit.

The two units of the motor shown in FIGURE 1 are separated by means of a feromagnetic partition 22 which provides a common flux return path for the two units. The second unit may be identical to the first and, accordingly, the same reference numerals have been applied to the rotor and stator components on both sides of the partition 22. A shaft timing pickup 23 is shown on the shaft 14 for sensing the position of the shaft and feeding that information to the control circuits.

Shown in FIGURE 3 is one circuit arrangement of the electronic switching circuit of the present invention. A pair of silicon controlled rectifiers 30 and 31 are connected in series between the terminals 26. The anode of the silicon controlled rectifier 30 and the cathode of the silicon controlled rectifier 31 is connected to one end of a capacitor 32 which, in turn, has the other end thereof connected to a pair of coils 33 and 35 representing the inductances of the coils 20. The coils 33 and 35 are operated together and are connected 180 electrical degrees out of phase with respect to each other as indicated by the phasing dots. The ends of the coils 33 and 35 which are opposite the capacitor 32 are connected together through a capacitor 36. Capacitor 36 is sufficiently large so that negligible A.C. voltages are developed across it. Also connected to the capacitor 36 is a DC bias potential by means of terminals 37 and 38. The timing pulses derived from the shaft timing pickup 23 of FIGURE 1 are applied to the gate electrodes of the silicon controlled rectifiers 30 and 31 and serve as triggering means to synchronously alternately render the silicon controlled rectifiers conductive.

The circuit arrangement shown in FIGURE 3 is especially suitable for single speed operation of the motor 10. The same type of circuit can, however, be used for multi-speed operation at frequencies lower than the resonant frequency.

In the circuit of FIGURE 4, the coils 33 and 35 are essentially connected in parallel, from an AC standpoint, through capacitor 36. The capacitor 36 is relatively large in value compared to the value of capacitor 32. The parallel connected coils 33 and 35, together with capacitor 32, form a resonant circuit the frequency of which is equal to the motor frequency. The potential applied to negative terminal 26 may be derived from a separate power source than the potential applied to the positive terminal 26, or the potential applied to terminal 26 may be derived from a single power source. In either case, the potential delivered to negative terminal 26 must be negative with respect to ground potential and the potential delivered to positive termnial 26 must be positive with respect to ground potential.

The DC bias potential delivered between terminals 37 and 38 serves to maintain the AC waveform through the coils 33 and 35 at some predetermined DC level.

The silicon controlled rectifiers 30 and 31 are alternately rendered conductive to provide a current flow through the coils 33 and 35. For example, when the silicon controlled rectifier 30 is conductive, current will flow from ground through the coils 33 and 35 and through the capacitor 32. During this time, because of the resonant nature of the circuit, the capacitor 32 becomes charged and current flow through the silicon controlled rectifier is reversed, causing the silicon controlled rectifier to revert to its non-conductive state. After the silicon controlled rectifier 30 becomes non-conductive, a triggering pulse is applied to the gate electrode of silicon controlled rectifier 31, thereby rendering the silicon controlled rectifier 31 conductive, and allowing current flow from the positive terminal 36 to flow through the capacitor 32 and coils 33 and 35. This current flow discharges the capacitor 32 from its previous potential and tends to charge the capacitor 32 to an opposite potential. Again the capacitor 32 becomes charged, but in the opposite sense, thereby reversing the current flow through the coils 33 and 35 and causing the silicon controlled rectifier to revert to its non-conductive state.

As seen in FIGURE 4, the circuit arrangement of FIGURE 3 can provide two basic types of useful current waveforms through the coils 33 and 35. One of the waveforms is indicated by a curvilinear line 40 which shows the current varying from zero to a maximum. This waveform configuration can be obtained by properly selecting the bias potential applied to terminals 37 and 38. A second waveform configuration indicated by a curvilinear line 41 may be obtained by selection of the bias potential between terminals 37 and 38. The curvilinear line 41 is intended to indicate a varying current which is riding on a DC potential. When the bias between terminals 37 and 38 is selected to provide a current flow indicated by the waveform 40, maximum torque is developed by the motor 10. However, selecting a bias potential which will develop the waveform 41 through the coils 33 and 35 will reduce the torque of the motor 10 but will substantially improve the power factor of the motor. This reduces the ratio of circulating power to real power by making the circuit operation depend less critically on rotor speed.

The shaft timing pickup 23 shown in FIGURE 1 functions to supply information regarding motor shaft position. This information, whether it be in the form of high frequency bursts or pulses can be converted by conventional circuitry (not shown) to electrical impulses of amplitude and waveform suitable for operating a silicon controlled rectifier.

Since the coils 33 and 35, together with the capacitor 32, form a series resonant circuit which is periodically pulsed by the silicon controlled rectifiers 30 and 31, the motor 10 is substantially a constant speed motor. However, the power levels of the motor 10 may be varied in several ways. For example, the supply voltage may be varied thereby changing the current flow through the coils 33 and 35. Also, the trigger pulses applied to the gate electrodes of the silicon controlled rectifiers 30 and 31 may be shifted in time to render the silicon controlled rectifiers conductive slightly out of phase with respect to the resonance of the circuit. Still another method of varying the power level of the motor 10 is to change the value of capacitor 32 so as to alter the resonant frequency of the circuit with respect to the operating frequency of the motor 10. Yet another method of varying the power level of the motor 10 is to couple the silicon controlled rectifiers 30 and 31 through an impedance changing device such as a variable transformer.

FIGURE 5 shows a somewhat simplified circuit arrangement of the electronic switching circuit of FIGURE 3. In FIGURE 5, the capacitor 36 is eliminated and the motor unit coils 33 and 35 are connected together at one end. The capacitor 32 is connected to the coils 33 and 35 and to ground. A diode 43 is connected between the silicon controlled rectifiers 30 and 31 to provide a DC current in the coils 33 and 35. The circuit arrangement of FIGURE 5 provides a current waveform as illustrated by a curvilinear line 44 of FIGURE 6. It will be noted that the waveform 44 has a current minimum of zero. This waveform, which has a finite period of zero current, is slightly more advantageous than the waveform 40 of FIGURE 4 in that it yields lower coil losses for a given average output torque. In the circuit arrangement of FIGURE 5, the frequency of the triggering pulses delivered to the silicon controlled rectifiers 30 and 31 is the same as in the circuit arrangement of FIGURE 3.

The circuit arrangements illustrated in FIGURE 3 and 5 both have several features which cause them to develop high voltages across the silicon controlled rectifiers under certain circumstances. These voltages raise the breakdown requirement of the silicon controlled rectifiers being used substantially above the values which would be necessary under optimum circumstances to supply the current waveforms shown in FIGURES 4 and 6. As a consequence, the cost of the silicon controlled rectifiers (which is approximately proportional to the volt-amp ratings) is higher than is fundamentally necessary when either of the basic circuits is used. This is overcome by modification of the basic circuits and will be discussed hereinbelow. The circuit additions can take a number of forms, so they will be disclosed separately to avoid undue complications of the basic circuit concepts illustrated in FIGURES 3 and 5.

The first voltage problem arises from an intrinsic property of silicon controlled rectifiers themselves. This property is the requirement of a finite time to develop high back-resistance following current reversal. This behavior is generally understood as follows: Under forward current conditions within the normal operating range of a silicon controlled rectifier, a high concentration of charge carriers is developed within the active volume of the silicon controlled rectifier. These carriers are liberated by the action of the forward electric field within the silicon controlled rectifier developed by the externally applied voltage. Their movement through the active volume also results from this field, and is characterized by a multi-collision migration process in which appreciable time is required for the carriers to traverse the active volume. If the internal field is reversed by a reversal of the applied voltage in a short time as compared to the time required for the carriers to traverse the active volume, the charge carrier flow reverses at the equilibrium density of the previous forward current flow. No new carriers will be released into the active volume because of the reversed internal field, but the reverse current flow will take place until the active volume is cleared of the carriers already in the region.

From an external resistance standpoint, the back resistance of a silicon controlled rectifier may increase from a few hundredths of an ohm to several hundred thousand ohms in several microseconds. The effect of this behavior on the circuit arrangements illustrated in FIGURES 3 and 5 is best understood with reference to FIGURE 7, which is an equivalent circuit of the circuit arrangement of FIGURE 3 from a switching standpoint. In FIGURE 7, a coil 46 is intended to represent an equivalent inductive component of the parallel combination of coils 33 and 35, FIGURE 3. A resistor 47 represents the sum of the resistances reflected by the electrical losses and the mechanical power produced.

Seen in FIGURE 8 is a current waveform 48 which represents the current flow through the silicon controlled rectifier 31. The current waveform through the silicon controlled rectifier 30 is substantially the same as that of the waveform 48 but shifted in time. The current waveform 48 shows the short reverse current pulse resulting from the silicon controlled rectifier property discussed above. The development of this reverse current, followed by the rapid buildup of silicon controlled rectifier back-resistance, produces an induction coil effect, resulting in a voltage spike across the silicon controlled rectifier in the backward direction. The amplitude of the spike varies with the current parameters to some degree, but generally is of the same order as the peak capacitor voltage which may be several times the supply voltage. Therefore, although the spike is in the opposite direction from the supply voltage, it can result in a large voltage across the silicon controlled rectifier. A similar spike exists across the silicon controlled rectifier 30 in the forward direction, adding to the supply voltage already impressed thereacross. Since the silicon controlled rectifier's forward and reverse breakdown voltages are generally about equal, the quiescent silicon controlled rectifier is actually jeopardized by the voltage spike to a greater degress than the silicon controlled rectifier producing it.

Two satisfactory approaches are illustrated for eliminating the inductive voltage buildup across the quiescent silicon controlled rectifier. The first approach is that shown in FIGURE 9. The capacitive network consisting of a capacitor 49 and a resistor 50 which are connected in series is shunted across the silicon controlled rectifier 30. Similarly, a capacitive network consisting of a capacitor 51 and a resistor 52 which are connected in series is shunted across the silicon controlled rectifier 31. The capacitive networks shunted across the silicon controlled rectifiers 30 and 31 are provided to limit the amplitude of the voltage pulses produced. The inductive energy developed during the reverse current surge is largely transferred to the shunt capacitors 49 and 51 so that peak pulse voltage varies approximately as the square root of the quotient of the inductive energy over the shunt capacity value. The proper choice of values for the capacitors 49 and 51 results in a satisfactory limitation of the voltage pulse amplitude while still providing sufficient back voltage to assure silicon control rectifier turn-off.

The resistors 50 and 52 limit the current surge during silicon control rectifier turn-on due to the discharge of the associated capacitor through the silicon controlled rectifier. Large currents during silicon controlled rectifier turn-on dissipate substantial power, and must be limited to avoid de-rating of the silicon controlled rectifiers. The resistors 50 and 52 also prevent circuit ringing when the silicon controlled rectifiers are turned off. The value of the resistors 50 and 52 can be chosen on the basis of providing best damping action with satisfactory surge limiting action being obtained as a secondary result.

A second approach of eliminating the inductive voltage pulse amplitude is shown in FIGURE 10. A series network consisting of a coil 53, a resistor 54 and a diode 55, which are connected in series, is shunted across the silicon controlled rectifier 30. Similarly, a network consisting of a coil 57, a resistor 58 and a diode 59, which are connected in series, is shunted across the silicon controlled rectifier 31. By this method, the reverse current from the capacitor 32, coil 46 and resistor 47 of the motor circuit is allowed to flow through the diodes 55 and 59 after their respective silicon controlled rectifiers have been turned off. By avoiding the rapid decrease of current through the motor coils, the buildup of an inductive voltage spike by the time-changing back resistance of the silicon controlled rectifiers is avoided. The resistors 54 and 58 and the coils 53 and 57 are placed in the circuit to develop sufficient reverse voltage across the silicon controlled rectifiers to assure that the silicon controlled rectifiers will be turned off.

In addition to the problem of the voltage spike discussed above, there is another circumstance which may cause excessive voltage across the silicon controlled rectifiers, as described in the following. Since it is necessary to allow a finite time for rendering the silicon controlled rectifiers non-conductive, the triggering of the quiescent silicon controlled rectifier must be delayed slightly with respect to the current zero through the conducting silicon controlled rectifier. If this delay is not sufficiently long, the silicon controlled rectifier which is in the process of being rendered non-conductive will be rendered conductive upon triggering of the other silicon controlled rectifier, resulting in power supply short-circuiting. Therefore, it is necessary that a short but finite time exist during each half cycle during which the silicon controlled rectifier currents are negligibly small and during which the peak capacitor vlotage is applied to the silicon controlled rectifiers. Since this voltage is in many cases substantially larger than the supply voltage, it can add to the silicon controlled rectifier breakdown voltage requirements.

The circuit arrangement shown in FIGURE 10 illustrates a satisfactory solution to this problem. During the time when current is flowing through the diode 55, for example, the voltage at circuit point 60 is held relatively close to the negative supply voltage of the negative terminal 26. Therefore, the voltage across the silicon controlled rectifier 31 is only slightly greater than twice the supply voltage which is the theoretical minimum requirement for operation of the circuit. The circuit shown in FIGURE 10 has the further advantage of eliminating the shunt capacitors 49 and 51 of FIGURE 9, thereby resulting in a more rapidly changing voltage during the time when the silicon controlled rectifier is turned on. As a consequence, the current surge and turn-on power problems which may exist in the circuitry of FIGURE 9 may be avoided.

Seen in FIGURE 11 is a modified circuit arrangement of the electronic switching circuits shown in FIGURES 3 and 5. The coils 33 and 35 are connected in series between the anode of the silicon controlled rectifier 30 and the cathode of the silicon controlled rectifier 31. The capacitor 32 is connected intermediate the coils 33 and 35 and to ground. Therefore, current will flow first through one of the coils and then through the other coil as the silicon controlled rectifiers 30 and 31 are alternately rendered conductive. By utilizing the circuit arrangement of FIGURE 11, the motor 10 can be operated as a multi-speed motor. As in the circuits shown in FIGURES 3 and 5, properly timed trigger signals must be supplied to the gate electrodes of the silicon controlled rectifiers 30 and 31.

Shown in FIGURE 12 are current waveforms 61 and 62 which pass through one of the motor coils, for example, coil 33. The current waveform 61 represents the low speed operation of the motor coils, while the waveform 62 represents the high speed operation of the motor coil. The waveform 61 has a shape which is similar to one-half of a sine wave. However, the time interval of the waveform 61 is determined by the mean inductance of the motor coil during the current pulse and the value of the capacitor 32. At higher speeds, the waveform 62 becomes asymmetrical because of increased inductance during the cycle, however, the current pulse width remains substantially the same. The silicon controlled rectifiers are rendered non-conductive at the end of the current pulse, since at that time the capacitor voltage is greater than the supply voltage and opposite in polarity. This reverse voltage is maintained for a significant period, even after the other silicon controlled rectifier is rendered conductive. As a result, the turn-off action of the silicon controlled rectifiers is very positive. Further, as seen by the waveform 62, the pulse width of the waveform during high speed operation of the motor 10 may be substantially longer than one-half of the operating cycle. This type of operation results in direct reactive energy exchange between the motor coils, thereby lowering the capacitor energy stored and the power handling requirements of the silicon controlled rectifiers. A feature of the circuit shown in FIGURE 11 is that the initial rate of rise of the current pulse is limited to relatively low values by the motor coil inductance. As a consequence, the silicon controlled rectifier turn-on powers are held to low values.

Several methods of speed control may be employed in the circuit arrangement of FIGURE 11. The most direct method of control is to vary the supply voltage. This is often most convenient in low power applications. Under some load conditions, it is possible to obtain a constant desired speed by choosing the proper supply voltage. However, a speed sensor may be attached to the motor and its output used to control either the supply voltage or some other torque-varying parameter which may be used. Another method of controlling motor torque is to vary the value of capacitor 32. This can be accomplished by connecting one or more capacitors into the circuit by suitable switch means.

Still another method of varying motor torque is by use of an electronic circuit such as shown in FIGURE 13. The circuit arrangement of FIGURE 13 has a silicon controlled rectifier 64 which is connected between the negative terminal 26 and the silicon controlled rectifier 30. Connected between the silicon controlled rectifiers 30 and 64 is the anode of a diode 65, and the cathode of the diode 65 is connected to ground potential. Similarly, a silicon controlled rectifier 66 is connected between the positive terminal 26 and the silicon controlled rectifier 41. A diode 67 has its cathode connected between the silicon controlled rectifiers 31 and 66 and its anode connected to ground potential. The silicon controlled rectifiers 64 and 66 are cycled on and off by suitable speed control circuitry. When the silicon controlled rectifiers 64 and 66 are rendered conductive, the circuit arrangement of FIGURE 13 operates in substantially the same manner as the circuit arrangement of FIGURE 11. However, when the silicon controlled rectifiers 64 and 66 are rendered non-conductive, the circuit draws no power from the supply voltage, but instead consumes the circulating reactive power and a rapid decrease in current amplitude results. The current amplitude is built up again during the conductive portion of the control cycle. This is best seen by the current waveform 68 of FIGURE 14, which represents the current passing through one of the coils 33 or 35. The speed control circuitry controls the time interval of the conductive and non-conductive portions of the speed control cycle, thereby varying the average amplitude of the current waveform. Therefore, the average motor torque is increased or decreased as is necessary to approach the desired speed of the motor 10.

The circuit arrangement shown in FIGURE 13 may be used in the manner to enhance the output of the motor 10. When operating at maximum torque levels, it is common for reluctance motors of the type disclosed, under certain conditions to evidence substantial inductance decreases during maximum current flow through the coil because of saturation of the ferromagnetic materials employed. As a consequence, the coil current waveform during high torque operation becomes narrow at the peaks as compared to the coil current waveform during low torque operation, as is seen in FIGURE 15. The narrow current waveform 69, FIGURE 15, at high currents is poor from an average torque production standpoint because the high currents and torques exist only for a relatively small fraction of the operating cycle.

The circuit arrangement shown in FIGURE 13 is used to enhance motor torque by triggering the silicon controlled rectifiers 64 and 66 during a maximum output condition of each cycle. This is accomplished by delayed triggering of the silicon controlled rectifiers 64 and 66 with respect to the triggering of silicon controlled rectifiers 30 and 31. The resultant current waveform through one of the coils 33 or 35 is shown in FIGURE 16. The silicon controlled rectifiers 30 and 31 are triggered before the silicon controlled rectifiers 64 and 65, thereby discharging the stored energy in capacitor 32 through their respective diodes 65 and 67. This action causes the initial current rise to reach a maximum as the voltage across the capacitor 32 decreases to zero, and then to decrease as indicated by reference numeral 71 of FIGURE 16. If the discharge of capacitor 32 were to continue, the current waveform would continue to decrease as indicated by the dotted line 72. However, at some time $t_1$ after the triggering of the silicon controlled rectifiers 30 or 31, one of the silicon controlled rectifiers 64 or 66 is triggered, thereby connecting the power supply in series with the capacitor 32 and either of the coils 33 or 35. When the time interval $t_1$ is properly selected, the supply voltage introduced into the circuit causes the current to increase to substantially the same value and then decrease as indicated by the solid line 73 of the current waveform of FIGURE 16. This action increases the time interval of the current pulse and increases the fraction of the pulse during which high current flows. The time interval of the base of the waveform of FIGURE 16 can be adjusted by changing the product of the inductance and capacitance of the circuit so that the pulse overlap condition and the turn-off of the silicon controlled rectifier can be made the same as the single-peak pulse of FIGURE 15. The circuit arrangement of FIGURE 13 is utilized to increase the fraction of time during which high currents flow through the coils 33 and 35, thereby increasing the average torque of the motor 10.

Therefore, the present invention has provided simple and efficient electronic switching circuitry for controlling dynamoelectric machines. It should be understood that variations and modifications may be effected without departing from the spirit and scope of the novel concepts of this invention.

What is claimed is:

1. A variable reluctance dynamoelectric motor assembly comprising:
   a frame,
   a shaft supported for rotation within said frame,
   at least one rotor element secured to said shaft,
   a plurality of stator elements in interleaved relation with the rotor elements,
       said rotor and stator elements each consisting of disks having alternating sectors of magnetic and non-magnetic materials,
   an energizing coil about said rotor and stator elements arranged to apply an axial magnetic field along the array of rotor and stator elements,
   rotation of said shaft providing varying reluctance paths axially of said motor,
   a capacitor in circuit relation with the inductance of said coil,
   and electronic switch means for passing the current developed through the combination of said inductance and capacitor while said current is at a maximum into said motor at a time when said axial reluctance is diminishing.

2. The assembly of claim 1 in which said electronic switch means consists of a silicon controlled rectifier.

3. The assembly of claim 1 in which the inductance of said energizing coil and said capacitor have a resonant frequency substantially equal to the operating frequency of said motor.

4. In a variable reluctance motor assembly, an electronic switching circuit comprising:
   first and second electronic switch means each having an anode, cathode, and control electrode, the anode of said first switch means being connected to the cathode of said second switch means;
   coil means of the motor under control;
   a capacitor connected to said coil means to form a resonant circuit, the frequency of which is substantially equal to the operating frequency of the motor, the resonant circuit formed by said coil means and said capacitor being connected between the anode and cathode of said first and second switch means, respectively, and ground potential;
   a source of negative potential connected to the cathode of said first switch means;
   a source of positive potential connected to the anode of said second switch means; and
   triggering means connected to the control electrodes of said first and second switch means for alternately rendering said first and second switch means conductive to supply energizing power to said coil means of the motor under control.

5. The electronic switching circuit of claim 4, wherein said coil means includes two coils of the dynamoelectric machine under control which are connected in AC parallel and 180 electrical degrees out of phase with respect to one another.

6. The electronic switching circuit of claim 5, further including DC biasing means connected to said coils for maintaining a portion of the current passing through said coils at some predetermined value.

7. The electronic switching circuit of claim 4, further including first and second capacitor networks, said first capacitor network being connected between the cathode and anode of said first electronic switch means and said second capacitor network being connected between the cathode and anode of said second electronic switch means.

8. The electronic switching circuit of claim 4, further including first and second resistor-capacitor networks, said first resistor-capacitor network being connected between the cathode and anode of said first electronic switch means and said second resistor-capacitor network being connected between the cathode and anode of said second electronic switch means.

9. The electronic switching circuit of claim 4, including first and second inductive networks, said first inductive network being connected between the cathode and anode of said first electronic switch means and said second inductive network being connected between the cathode and anode of said second electronic switch means.

10. The electronic switching circuit of claim 9, wherein said first and second inductive networks each include a diode connected in series therewith.

11. The electronic switching circuit of claim 4, wherein said coil means includes two coils of the motor under control which are connected in series between the anode of said first electronic switch means and the cathode of said second electronic switch means, and said capacitor having one end thereof connected between said coils and the other end thereof connected to ground potential.

12. The electronic switching circuit of claim 4, wherein said coil means includes two coils of the motor under control which are connected in series between the anode of said first electronic switch means and the cathode of said second electronic switch means, and said capacitor having one end thereof connected between said coils and the other end thereof connected to ground potential; a first diode having its anode connected to the cathode of said first electronic switch means and its cathode connected to ground potential; a second diode having its cathode connected to the anode of said second electronic switch means and its anode connected to ground potential; a third electronic switch means having its anode connected to the cathode of said first electronic switch means and its cathode connected to said source of negative potential; a fourth electronic switch means having its cathode connected to the anode of said second electronic switch means and its anode connected to said source of positive potential; and said triggering means further including a source of triggering pulses which are delivered to the control electrodes of said first, second, third and fourth electronic switch means for rendering said first electronic switch means conductive before said third electronic switch means is rendered conductive, and for rendering said second electronic switch means conductive before said fourth electronic switch means is rendered conductive.

References Cited

UNITED STATES PATENTS 3,175,167 3/1965 Lloyd.
3,307,091 2/1967 Johannes _____ 318—138
3,333,171 7/1967 Platnick _____ 318—138

ORIS L. RADER, *Primary Examiner.*

G. SIMMONS, *Assistant Examiner.*